Figure 1:
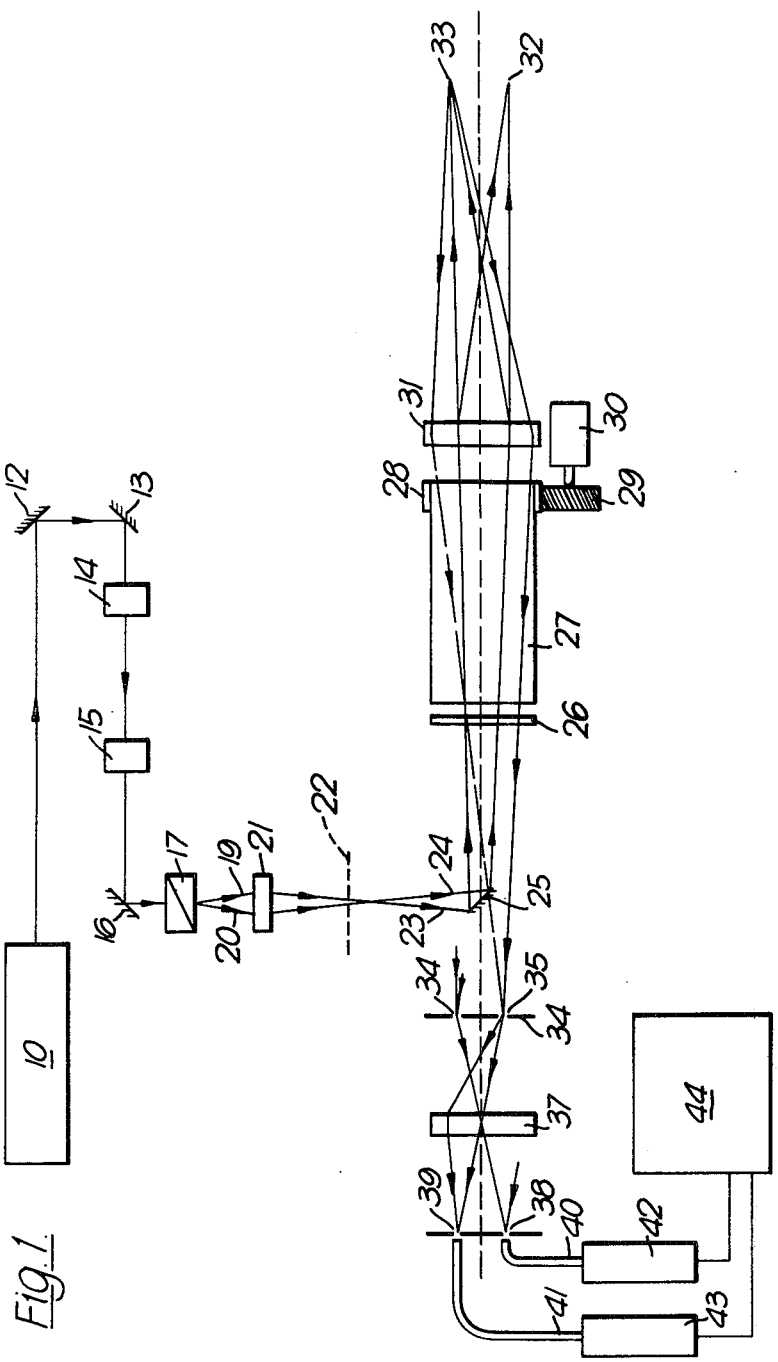

United States Patent [19]

Smart

[11] 4,125,778

[45] Nov. 14, 1978

[54] APPARATUS FOR LASER ANEMOMETRY

[75] Inventor: Anthony E. Smart, Spondon, England

[73] Assignee: Rolls-Royce Limited, London, England

[21] Appl. No.: 827,746

[22] Filed: Aug. 25, 1977

[30] Foreign Application Priority Data

Sep. 4, 1976 [GB] United Kingdom ............ 36723/76

[51] Int. Cl.² .................... G01N 21/00; G01N 21/26
[52] U.S. Cl. .................................. 250/574; 356/342
[58] Field of Search ............... 250/574, 573; 356/103, 356/28

[56] References Cited

U.S. PATENT DOCUMENTS 3,612,689  10/1971  Liskowitz ........................ 356/103
3,866,055  2/1975   Pike ............................... 250/574

Primary Examiner—Robert Segal
Attorney, Agent, or Firm—Cushman, Darby & Cushman

[57] ABSTRACT

Apparatus for laser anemometry comprises a device for producing coherent radiation, a beam splitter device adapted to divide the beam from this device into two beam portions, focussing means adapted to focus these two beam portions on to two adjacent spots, and two photodetector means each adapted to measure the scattered illumination from one said spot. In order to enable the direction of the path between the two spots to be altered without moving the entire apparatus, an image rotation device is provided and mounted to effect both the beam portions and the scattered radiation from the spots which falls on the photo-detector means.

11 Claims, 2 Drawing Figures

APPARATUS FOR LASER ANEMOMETRY

This invention relates to an apparatus for laser anemometry.

Laser anemometry is a technique in which a gas, the parameters of whose flow are to be measured, is illuminated by a source of coherent radiation, normally a laser. There have been two basic versions of this technique, in the first of which the laser radiation is modified in such a way as to produce a series of light and dark fringes within the region of gas whose flow is to be determined. The passage of particles between adjacent light portions of the fringe pattern may then be determined by the scattered light from these particles, hence the time taken for the particles to travel from one fringe to the next may be determined and the speed of the particles and thus of the gas may be calculated.

This technique was successfully used, particularly where relatively unrestricted access to a large volume of the gas was available, but difficulties arose where access was restricted and where only a small volume was available within which to measure the gas flow. Therefore the technique of two spot laser anemometry was devised. In this technique the beam from a laser is split into two portions which are used to provide illumination of two spots within the gas flow, these spots being separated by a very small distance. The back scattered light from these spots is then measured and by statistical techniques the time of passage of a particle from one spot to the other may be determined. Such devices may be easily used where it is only necessary to determine the gas velocity in one specified direction, this being the direction defined by the line joining the two spots. However, if it is required to provide more complete specification of velocities in other directions then it has previously been necessary either to provide relative motion between the gas and the measuring apparatus or to provide a complicated and relatively inaccurate linkage between the device producing the two spots and the devices which measure their intensities so that both of these may be rotated in unison.

The present invention provides a relatively simple way in which both the spots of light and the areas of detection may be caused to move simultaneously without physical movement of the laser or the detectors.

According to the present invention apparatus for laser anemometry comprises a device for producing coherent radiation, a beam splitter adapted to divide the beam from this device into two beam portions, focussing means adapted to focus these two beam portions onto two adjacent spots, and two photo-detector means each adapted to measure the scattered radiation from one said spot, and in which an image rotation device is interposed between the beam splitter and the spots so that it has a simultaneous effect both on the beams of radiation producing the spots and on the scattered radiation from the spots which falls on the photo-detector means.

A variety of image rotating devices may be used subject to certain criteria, but we prefer to use a 45° folded Abbe prism.

In a preferred embodiment the two beam portions and the scattered radiation returning to the photo-detectors pass along parallel paths through different areas of the image rotation device, and there is a mirror adapted to deflect differentially said two beam portions and said scattered radiation so as to separate them.

The device for producing coherent illumination is preferably a laser producing monochromatic light.

Figure 2:
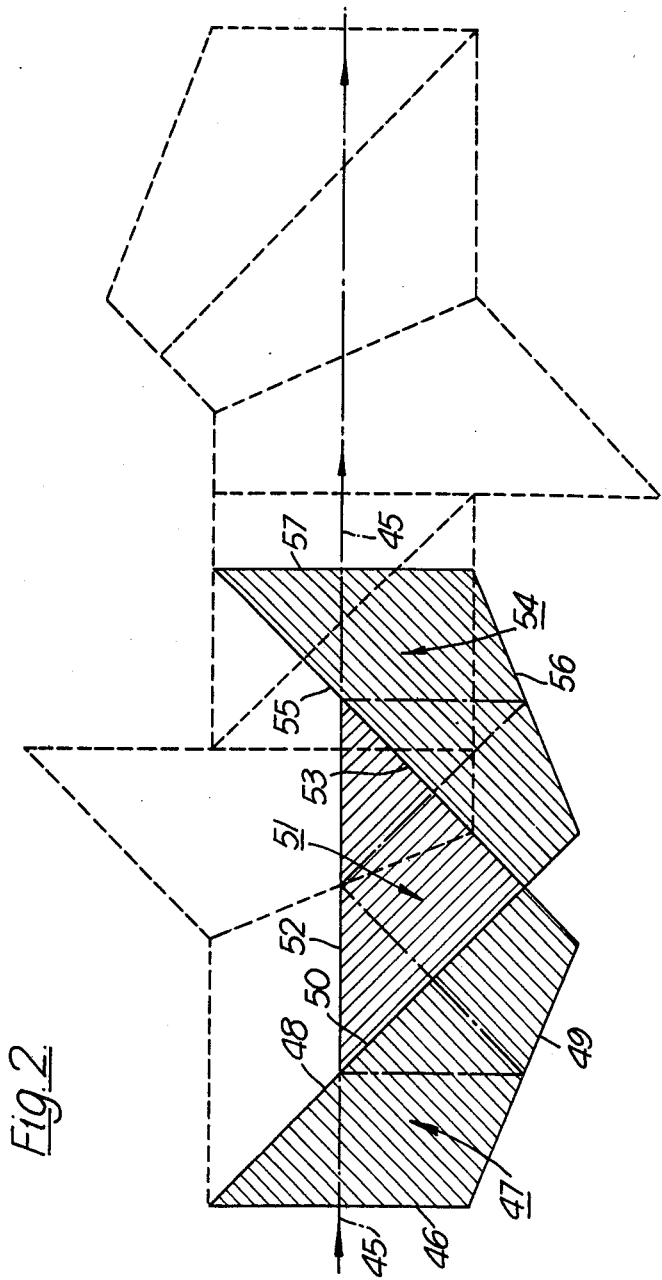

The invention will now be particularly described by way of example with reference to the accompanying drawings in which:

FIG. 1 is a much simplified schematic diagram of the optical layout of apparatus in accordance with the invention, and FIG. 2 shows a section through and a tunnel diagram of the image rotator of FIG. 1.

The apparatus of FIG. 1 comprises a laser 10 which in the present instance is a 15 Mw He Ne gas laser producing monochromatic light of wavelength 6328 Angstrom units. The collimated beam 11 from the laser is reflected from mirrors 12 and 13 and through a conditioning lens 14 and an acousto-optical switch 15 before it is reflected by a mirror 16 through a beam splitting device 17. The beam splitter 17 may be of any conventional type but in the present instance it is a Wollaston prism which separates the single beam into two beams having different polarisations. In the present instance the two beams 19 and 20 emerging from the splitter diverge only slightly from one another and occupy substantially the same volume of space; in the diagram they have been shows with an exaggerated divergence for clarity.

The beams 19 and 20 then pass through a primary focussing lens 21 which forms from the two beams, two point foci in the plane 22. It will be understood that in the diagram the paths of the rays involved has been considerably altered to allow the operation of the system to be visualised. However, it will be understood that the two foci produced by the lens 21 will act as objects whose image may be projected by the system described below.

Beams 23 and 24 from the two foci in the plane 22 then both reflect from a further mirror 25 towards a meniscus lens 26 and an image rotation device 27. This device could comprise one of a number of reflecting and/or refracting devices, but in this embodiment it consists of a 45° folded Abbe prism. As is known in the art, the effect of the prismatic device 27 is to displace the light rays passing therethrough by an amount which varies in accordance with the angular relation between the position of the device and a neutral position, the angular displacement being about the axis of the device.

It will be appreciated that the device 27, although plane parallel faced, is subject to spherical aberration. Consequently the meniscus lens 26 is introduced to the path of rays through the device 27, mounted so as to provide a correction of this aberration.

The device 27 is mounted within a circular rack 28 coaxial with the device and driven by a pinion 29 from a motor 30; therefore the displacement of the rays may be varied as described below.

The rays 23 and 24 emerging from the image rotation device 27 then pass through a focussing lens 31 which brings each of the beams 19 and 20 to a respective point focus at 32 and 33. It will be understood that although referred to as a point focus the point of illumination will have finite dimensions and is therefore referred to as a spot. These spots are arranged to be very closely spaced, and in this embodiment they are spaced by a distance of 664 μm. In operation the spots 32 and 33 are arranged to fall within the volume of gas whose parameters of motion are required to be determined. The gas is allowed or arranged to have particles carried with it, and it will be understood that whenever one of these particles passes through either or both of the spots 32 and 33 they will cause back scatter of light.

This back scattered light will initially return along an annular path coaxial with but lying outside the path which was followed by the illuminating rays 23 and 24, and they pass through the focussing lens 31, and through the image rotation device 27. After leaving this device they pass round the outside of the mirror 21, the periphery of the mirror thus acts as a return stop.

The return rays then come to point foci 34 and 35 in the plane of a stop plate 36. The plate 36 has apertures therein corresponding with the positions of the foci 34 and 35, the apertures being dimensioned to reduce the cross-talk between the two light beams and to reduce as far as possible the size of the detected area of the spots 32 and 33. It will be understood that additional stops could be introduced in other parts of the system if desired.

The rays then meet a further focussing lens arrangement 37. It will be understood that up until passing the mirror 25, in a similar fashion to the illuminating rays the back scattered rays will be affected by the same optics as each other. The focussing lens 30 however brings the two back scattered rays to separate foci at 38 and 39, these being arranged to be the image surfaces of fibre optic light guides 40 and 41 respectively. A stop plate is also shown in this location.

The light guides are arranged to carry the light to a convenient position to input the back-scattered light to a respective one of photomultipliers 42 and 43. The guides comprise normal low-loss fibre optic devices, and their only purpose is to enable the relatively bulky photomultipliers to be suitably spaced and accommodated.

The photomultipliers are arranged to give electrical outputs which are indicative of the apparent brightness of the spots 32 and 33; this brightness will increase each time a particle passes through one of the spots. By suitable statistical operations carried out in a computing device indicated at 44 a determination can be made of those particles which pass sequentially through the spots 32 and 33, and by determining the time lapse between these two passages the speed of the gas flow in the direction of the line joining the spots may be determined.

As so far described the apparatus therefore provides a way of determining the gas flow velocity between the spots, but it will be appreciated that it is advantageous if velocities in other directions can be determined. This could of course be carried out by physically moving the entire apparatus with respect to the volume of gas in question, but this is cumbersome and the use of the image rotator 27 enables the relative positioning of the spots 32 and 33 to be altered merely by rotating the device 27 by the motor 30. As is known in the art the effect of devices such as 27 is to rotate the output beam of light about the axis of the device at an angular speed twice that of the device itself. Therefore by proper alignment of the optical system the spots 32 and 33 can be arranged to be equidistant from the axis of the device 27 and to rotate on a common circle about this axis when the device 27 is rotated. This therefore gives the facility to measure the velocity of the gas in any direction in a plane normal to the axis of the device 27. Because the back scattered light returns along a path through the device 27 parallel with that taken by the illuminating rays, it will be understood that once this light has been arranged to fall on the photomultipliers in one setting of the device 27 this relationship will be maintained for all rotations of the device, and there will be no need to move anything but the device 27 to set up the apparatus to measure the gas velocity in a different direction.

FIG. 2 shows in its cross hatched section the cross-section of the prims which form the device 27. The path of an axial ray through the device is shown as a chained line at 45, and it will be seen that this ray enters normally through the surface 46 of a first prism 47, suffers total internal reflection at surfaces 48 and 49 of this prism and exits normally through the surface 48. Parallel with and spaced closely from this surface there is the surface 50 of a prism 51 and the ray enters normally through this surface 50 of the prism, is internally reflected at the surface 52 and again exits normally through surface 53. Here it enters a third prism 54 which is a mirror image of the prism 47, and the path of the light through this prism is exactly opposite to that in 47; thus it enters normally through face 55, reflects from faces 56 and 55 and exits normally through 57.

A tunnel diagram of the prism is shown in dotted lines; such a diagram will be familiar to those skilled in the art and it is not elaborated on here, it will merely be pointed out that overall the optical properties of the prism may be likened to those of a parallel faced block of glass.

Although the particular device used has a number of advantages over alternatives it will be appreciated that there are a number of image rotation devices known in the art and which could be used with varying degrees of success in this application. Although it is clearly impossible to specify exactly which devices will be suitable, since this will depend amongst other things on their accuracy of manufacture and mechanical properties, we believe that the device should at least not be sensitive to the direction of polarisation of the transmitted light, not be prone to vignetting, and not produce distortions of the sagittal or tangential type, or other significant aberrations causing the distorting effect of the device to depart from that of a parallel faced block.

It will also be understood that the detailed layout of the optics could be varied from that shown, while it would be possible to use other sources of coherent radiation than the laser described above.

I claim:

1. Apparatus for laser anemometry comprising a device for producing coherent radiation, a beam splitter adapted to divide the beam from this device into two beam portions, focussing means adapted to focus these two beam portions on to two adjacent spots, and two photo-detector means each adapted to measure the scattered radiation from one said spot and in which an image rotation device is interposed between the beam splitter and the spots so that it has a simultaneous effect both on the beams of radiation producing the spots and on the scattered radiation from the spots which falls on the photo-detector means.

2. Apparatus as claimed in claim 1 and in which said image rotation device comprises a 45° folded Abbe prism.

3. Apparatus as claimed in claim 2 and comprising a meniscus lens mounted in the beam path so as to correct the spherical aberration produced by the prism.

4. Apparatus as claimed in claim 1 and in which each said beam portion and the corresponding scattered radiation returning to the respective photo-detector means pass through different areas of the image rotation device.

5. Apparatus as claimed in claim 4 and in which there is a mirror adapted to deflect differentially said two beam portions and said scattered radiation so as to separate them.

6. Apparatus as claimed in claim 5 and in which said mirror is adapted only to deflect said two beam portions into said image rotation device.

7. Apparatus as claimed in claim 6 and in which said scattered radiation passes round the outer periphery of said mirror.

8. Apparatus as claimed in claim 1 and in which said focussing means comprises a first lens adapted to provide first foci of said two beam portions and a second lens adapted to provide a projected image of said foci which forms said spots.

9. Apparatus as claimed in claim 1 and comprising fibre optic light guides adapted to direct the scattered radiation on to the photo-detectors.

10. Apparatus as claimed in claim 1 and in which said photo-detectors comprise photomultipliers.

11. Apparatus as claimed in claim 2 and in which the device for producing coherent radiation is a laser adapted to produce monochromatic light.

* * * * *